Figure 1:
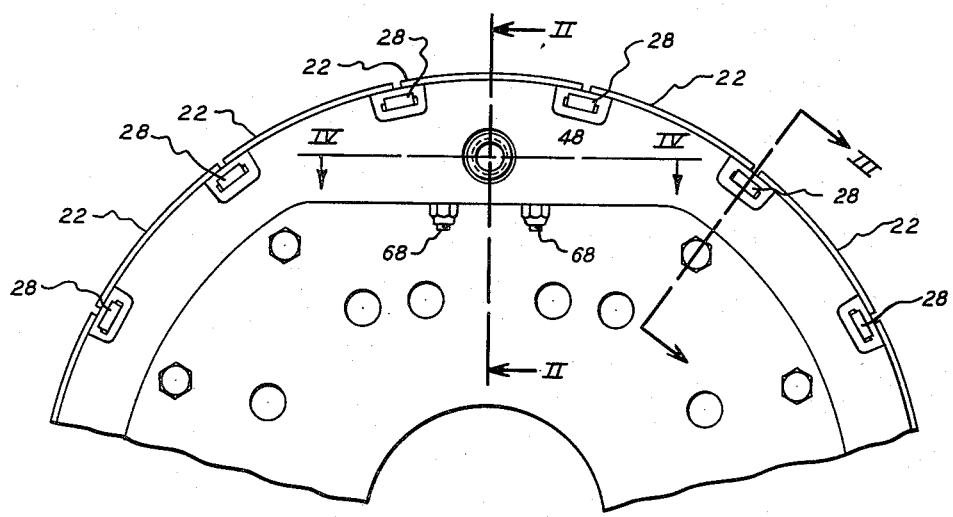

June 21, 1949. C. HOLLERITH 2,473,646
EXPANDER TUBE FOR BRAKES
Filed Nov. 27, 1944 2 Sheets-Sheet 1

Inventor
CHARLES HOLLERITH
By Bearman + Langford
Attorneys

June 21, 1949.  C. HOLLERITH  2,473,646
EXPANDER TUBE FOR BRAKES
Filed Nov. 27, 1944  2 Sheets-Sheet 2
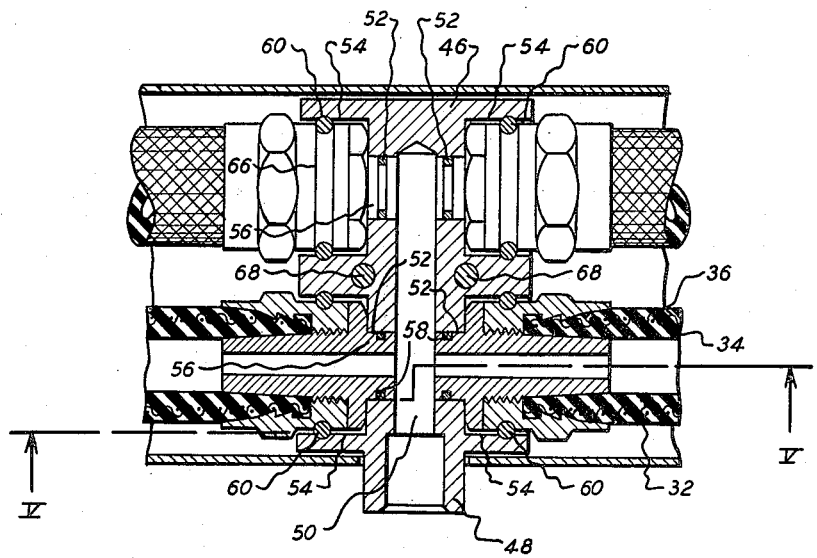
Fig_4_
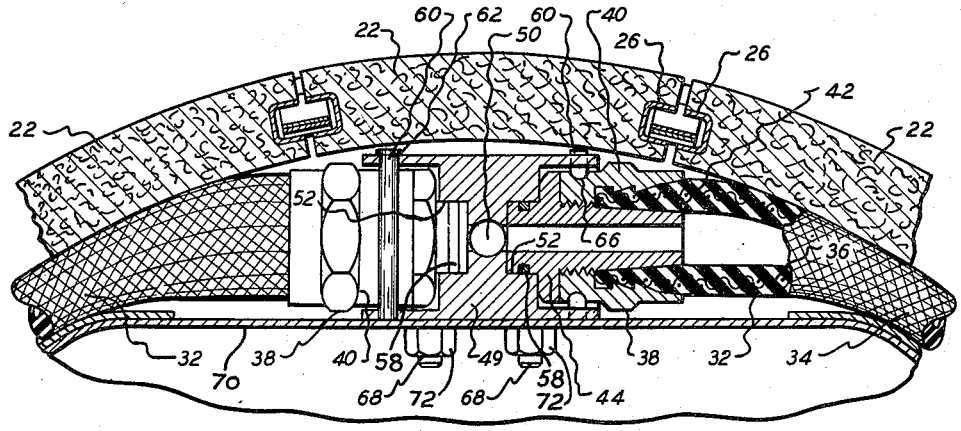
Fig_5_
Inventor
CHARLES HOLLERITH
By Beaman & Langford
Attorneys Patented June 21, 1949

2,473,646

UNITED STATES PATENT OFFICE 2,473,646

EXPANDER TUBE FOR BRAKES

Charles Hollerith, Jackson, Mich., assignor, by mesne assignments, to The B. F. Goodrich Company, Akron, Ohio, a corporation of New York Application November 27, 1944, Serial No. 565,338

4 Claims. (Cl. 137—156)

The present invention relates to improvements in expander tube for brakes in which fluid pressure is employed to extend the expansible element, which in turn reacts to bring one brake element into operative engagement with another. As exemplary of this type of construction reference may be had to the expander tube employed in the so-called expander tube type of brake to impart braking movement, either in axial or radial direction.

It is the object of the present invention to improve the construction and method of installation and assembly of the expansible element in brake structure of the type above described.

Another object of the invention is to provide an improved expander tube in which the expander tube is in the form of a cut length of tubing having hydraulic fittings on the opposed ends to complete the hydraulic connection.

A further object of the invention is to provide an improved expander tube in which the expander tube is in the form of a fabric covered hose having end fittings.

A still further object of the invention is to provide expander tubes in the form of cut lengths of fabric encased hydraulic hose having detachable end fittings for installation and replacement of the hose.

Other objects and advantages of the present invention more fully appear from the following specification and the annexed claims.

Figure 2:
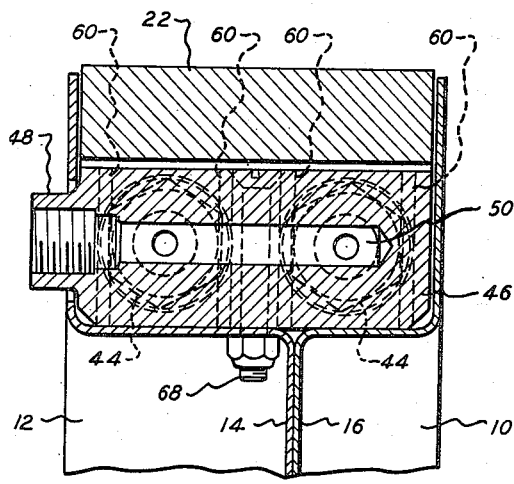
Figure 3:
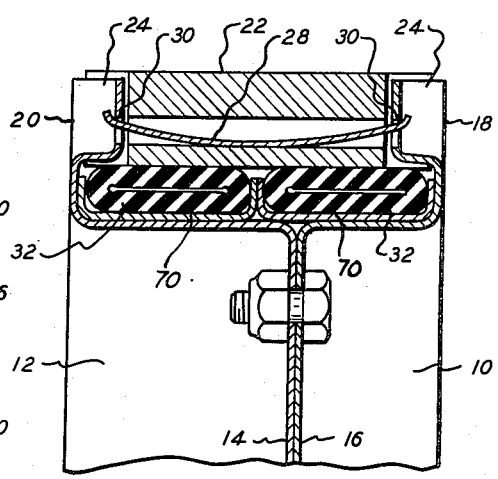

In the drawings,

Fig. 1 is a fragmentary side elevational view of a radial brake embodying the principles of the present invention, Fig. 2 is a cross-sectional view taken on line II—II through the hydraulic connection, Fig. 3 is a cross-sectional view taken on line III—III of Fig. 1, Fig. 4 is a cross-sectional view taken on line IV—IV of Fig. 1, showing the hydraulic connection of a pair of proposed end fittings in horizontal cross section, and Fig. 5 is a cross-sectional view taken on line V—V of Fig. 4.

For the purpose of illustration, the improvement of the present invention has been illustrated in connection with a brake construction made from sheet metal stampings and collectively defining a channel therein in which brake blocks are supported for radial expansion and contraction through assembly springs, the construction being more fully disclosed in my aforesaid patent. It will be understood, however, that certain minor changes in structural designs have been necessary to adapt the construction shown in the aforesaid patent to the present development.

As more fully shown in Figs. 1, 2 and 3, the structural frame of the brake assembly comprises sheet metal stampings 10 and 12 having web portions 14 and 16, which collectively define the torque flange connected to a fixed part in a well known manner. Flanges 18 and 20 define a channel-shaped rim in which the brake blocks 22 are supported. As more fully described in my aforesaid patent, depressions 24 in the flanges 18 and 20 take the thrust, the brake blocks 22 being notched to provide clearance for the depressions 24 and cross slotted at the opposed ends, as at 26, as more clearly shown in Fig. 5. Springs 28 extend through openings 30 in the depressions 24 and slots 26 to overlap the adjacent ends of brake blocks 22 to hold the same in assembled relation. This structure forms no part of the present invention.

In lieu of using an expander tube of conventional design which has heretofore always been made up as an integral one piece unit in the form of a continuous tubular member, the character of the fluid expanding member has been materially altered. According to the present invention the fluid expander construction for actuating the brake blocks 22 comprises one or more lengths of flexible hose construction 32, which preferably takes the form of a standard hydraulic hose in which a tubular rubber core is reinforced by layers of cotton braided material. As indicated in Figs. 4 and 5, the tubular rubber core 34 is externally reinforced with one or more braided layers of cotton or other strand 36, all in a well-known manner.

While I do not wish to limit myself to any specific hose construction or method of making the same, the preferred practice at the present time is to fabricate the hose to circular form and then flatten the hose to the construction shown in Fig. 3 with the application of pressure and heat to permanently set the same.

Each expander 32 has end fittings 38 which are preferably of a detachable construction, although it is anticipated that swedged on fittings or other conventional types may be employed. In the preferred form, the end fittings 38 comprise sockets 40 into which the hose ends 42 are inserted. Nipples 44 are then threaded into the sockets 40 to detachably connect the end fittings to the hose, all in a well-known manner.

One of the important features of the present development is considered to reside in the fluid manifold 46 and its connection with the expander elements 32. As shown, the manifold 46 has a connector 48 communicating with the passage 50 having side branches 52 coupling into counterbored portions 54. Each end fitting 38 has a cylindrical end portion 56 which is closely fitted within the branches 52. Each end portion 56 is provided with a peripheral groove in which is located a resilient sealing ring 58. The fittings 38 are held in position in the manifold 46 through pins 60 operating in holes 62 and 64 which are in tangential alignment with grooves 66 in the sockets 40. As is more clearly shown in Fig. 5, the brake blocks 22 directly over the fluid manifold 46 prevent accidental displacement of the pins 60. It should be apparent that on removing the pins 60 from interlocking engagement with the grooves 66 that the end fittings 38 may be removed from their fluid sealed relation with the manifold 46.

To replace one or both of the expander elements 32 of the illustrated embodiment, retractor springs 28 are removed to permit removal of the brake blocks 22. The pins 60 are then removed and the end fittings 38 with their associated expander tube hose 32 may be removed from the manifold 46. The sockets 40 and nipples 44 can then be disassembled and reassembled on a new length of hose 32 which may be cut to the proper length from a coil to avoid stocking different lengths of hose 32. The repaired assembly can then be reinstalled in the manifold 46 and held in place through the insertion of the pins 60, the flexible seals 52 sealing the associated parts against leakage.

As more clearly shown in Fig. 3, the elements 32 are positioned by annular channel members 70.

The manifold itself is detachably secured upon a chordal rim portion 70 of the torque flange through the medium of the bolts 68 and nuts 72.

Having thus described my invention, what I desire to secure by Letters Patent and claim is:

1. In a fluid brake having a brake element displaced by fluid pressure confined within an actuating means, actuating means comprising a pair of double ended expander tubes, end fittings for said tubes, a fluid manifold in which said fittings are received, and means for detachably connecting said end fittings to said manifold.

2. In a radial hydraulic brake of the type having a plurality of radially expandable brake elements, and a rim in which brake elements are supported, a radially expandable actuator element, said element being in the form of a flattened tube of double ended cut length construction, hydraulic end fittings for said tube, and a hydraulic connection receiving said end fittings in opposed relation.

3. In a fluid brake having a brake element displaced by fluid pressure confined within an annular expander actuating means, an actuating means comprising a double-end expander tube, end fittings on said tube, and a fluid connection having a pair of outlets to which the said end fittings are capable of being detachably connected to provide with the fluid connection an annular expander.

4. In a fluid brake having a brake element displaced by fluid pressure confined within an annular expander actuating means, actuating means comprising a pair of double-ended expander tubes, fluid conducting end fittings for said tubes, a common fluid manifold for the latter, said manifold having opposed pairs of fluid outlets, and means for detachably connecting said end fittings to said outlets to form with the manifold and tubes an annular expander.

CHARLES HOLLERITH.

REFERENCES CITED

The following references are of record in the file of this patent:

UNITED STATES PATENTS

| Number | Name | Date |
| --- | --- | --- |
| 170,155 | Caswell | Nov. 23, 1875 |
| 789,689 | Gold | May 9, 1905 |
| 1,089,650 | Kile | Mar. 10, 1914 |
| 1,260,284 | Bennett | Mar. 19, 1918 |
| 1,585,837 | Eiker | May 25, 1926 |
| 2,185,250 | Frank | Jan. 2, 1940 |
| 2,243,229 | Tarris | May 27, 1941 |
| 2,256,431 | Hunter et al. | Sept. 16, 1941 |
| 2,377,170 | Morgan | May 29, 1945 |

FOREIGN PATENTS

| Number | Country | Date |
| --- | --- | --- |
| 733,564 | France | 1932 |